United States Patent [19]

Epstein

[11] Patent Number: 4,658,748
[45] Date of Patent: Apr. 21, 1987

[54] RELEASEABLE HOOK

[75] Inventor: Irving Epstein, Mercer Island, Wash.

[73] Assignee: Washington Chain & Supply, Inc., Seattle, Wash.

[21] Appl. No.: 126,372

[22] Filed: Mar. 3, 1980

[51] Int. Cl.[4] .................................................. F16G 11/00
[52] U.S. Cl. .................................................... 114/217
[58] Field of Search .............. 114/230, 247, 252, 249, 114/215, 217, 253; 294/83 R, 84; 280/449, 450, 452–455; 180/14.5; 213/211, 1; 172/269, 272, 275; 64/29; 24/115 F

[56] References Cited

U.S. PATENT DOCUMENTS

| | | | |
|---|---|---|---|
| 1,391,058 | 9/1921 | Hulsebos et al. | 280/455 |
| 1,402,862 | 1/1922 | Hulsebos et al. | 280/455 |
| 1,872,750 | 8/1932 | Ketel | 280/455 |
| 3,110,331 | 10/1963 | Buchanan | 114/252 |
| 3,762,757 | 10/1973 | Epstein | 114/230 X |
| 4,034,992 | 7/1977 | Epstein | 294/83 R |

Primary Examiner—Trygve M. Blix
Assistant Examiner—Stephen P. Avila
Attorney, Agent, or Firm—Thomas W. Secrest

[57] ABSTRACT

In the mooring of ships, boats and barges to a dock or oil well platform it is necessary to have a line run from the ship or boat or barge to the dock or platform. The line running from the dock or platform to the ship or boat or barge is under tension. This invention is directed to a RELEASEABLE HOOK which, automatically, trips and releases the line when the tension on the line exceeds a predetermined tension. The ship or boat or barge at that time is free to move. The increase in the tension in the line maybe be brought about by rough water or by a wind or other causes. This RELEASEABLE HOOK is a design to trip and release the line without an operator. The tension in the line, when it exceeds a predetermined tension or pressure on the hook, will cause the hook to automatically trip.

9 Claims, 16 Drawing Figures

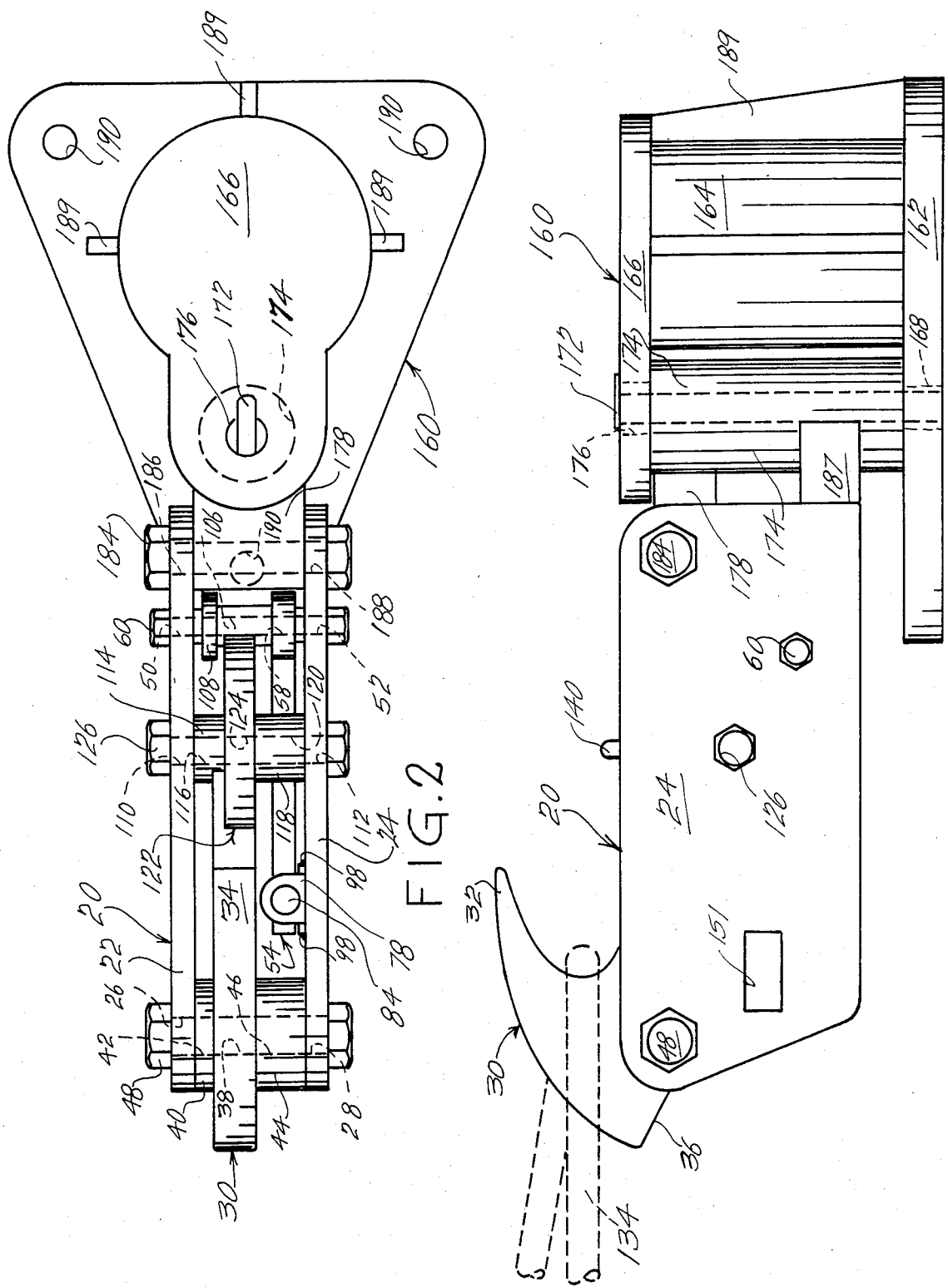

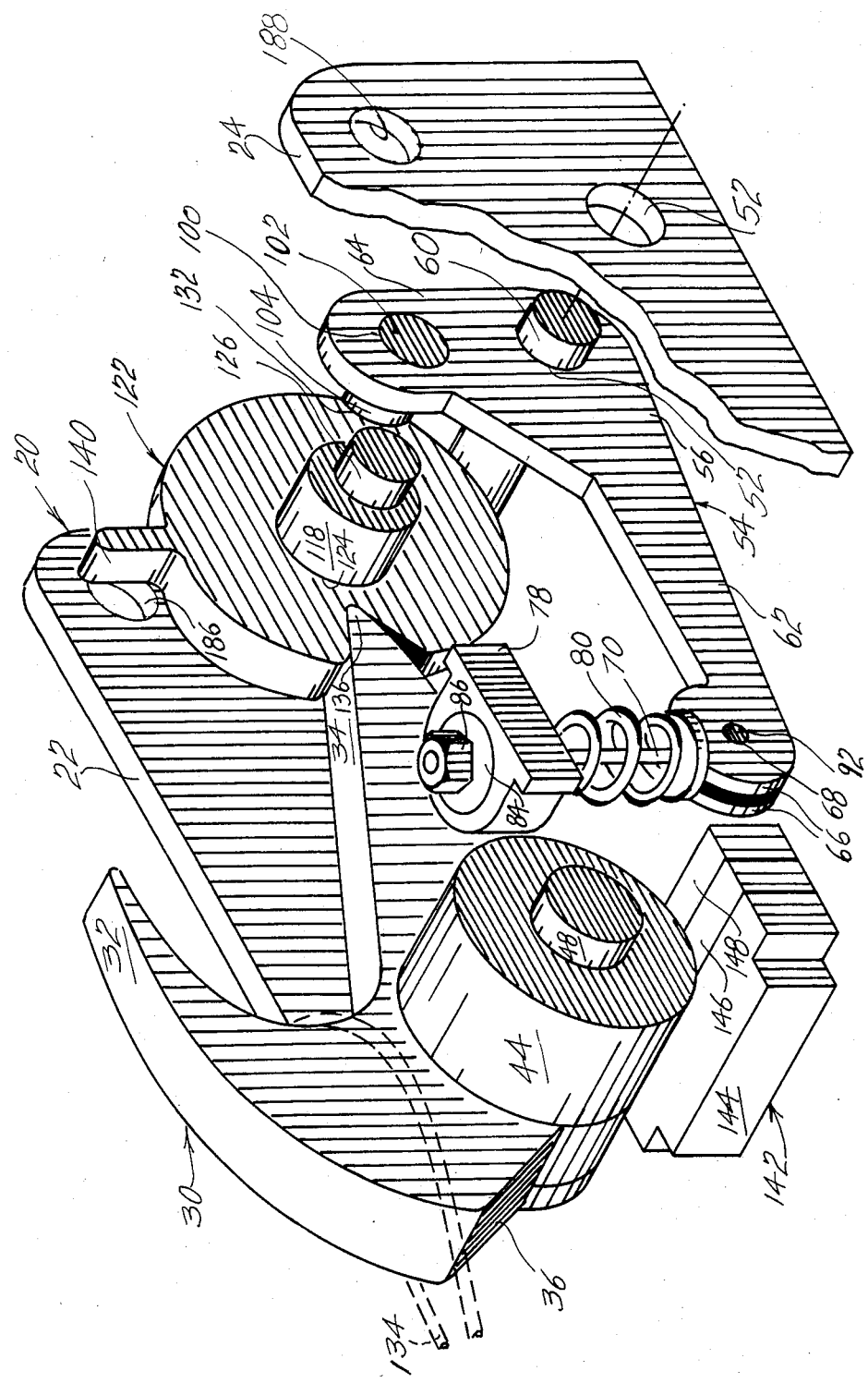

RELEASEABLE HOOK

CROSS REFERENCES TO RELATED APPLICATION

There is co-pending with this patent application another application entitled, "A RELEASEABLE HOOK", filing date of Ser. No. 695,119 filing date June 11, 1976, now U.S. Pat. No. 4,389,907.

A BRIEF SUMMARY OF THE INVENTION

A releaseable hook can be used for mooring a boat or a ship or a barge to a dock or to an oil well platform or to another ship or to a boat or to a barge.

Many releaseable hooks are designed to be released by an operator, either by a manual release or by a mechanical release.

This particular releaseable hook is designed to allow the hook to rotate and to release a line when the tension on the line exceeds a predetermined tension. This releaseable hook can be considered to be a safety releaseable hook. If the tension on the line to the hook exceeds a certain predetermined tension then the hook will rotate to release the line.

The hook need not be released by a manual operation such as by an operator.

When the tension on the line exceeds a predetermined tension the hook trips, of its own accord, to release the line.

There is designed into the hook means to vary the predetermined tension required to trip the hook.

The releaseable hook can be used in an emergency situation. The use of a hook is not restricted to a boat or to a barge or to a ship. For example, a fisherman casts out nets from the fishing boat. The net or nets may be caught on the bottom. For example, the nets may be caught on coral or rocks or a ledge or on submerged quipment. If the fisherman, with a winch, pulls in the nets, the nets will be torn and damaged. With this release hook the hook can be set to release at a predetermined tension such as a pull of one ton on the hook or line or a pull of ten tons or up to twenty-five tons. With this release hook and if a net is caught on the bottom and the fisherman wants to raise the net and the pull on the line exceeds a predetermined figure, the release hook automatically releases the line connecting with the fishing net. Then, a diver can dive to the bottom and release the net from the coral or rocks or ledge or submerged equipment. The fishing net is not damaged or damaged only a minimal amount. In this manner the release hook does protect certain equipment, such as fishing nets. The release of the line by the hook is not restricted to fishing nets but can be used with other items where it is necessary to automatically release the line when the tension in the line exceeds a predetermined desired tension.

Again, this releasing of the end portion of the hook is made possible by the catch means or by the yoke, depending upon whether a mechanical controlled release hook is used or a hydraulic controlled release hook is used.

THE DRAWINGS

FIG. 1 is a side elevational view of one species of the releaseable hook and associated equipment and, in particular, a mechanically controlled hook having a catch means or cam;

FIG. 2 is a top plan view of the releaseable hook;

FIG. 3 is a fragmentary perspective exploded view of the hook in a locked position;

A SPECIFIC DESCRIPTION OF THE INVENTION

Figure 4:
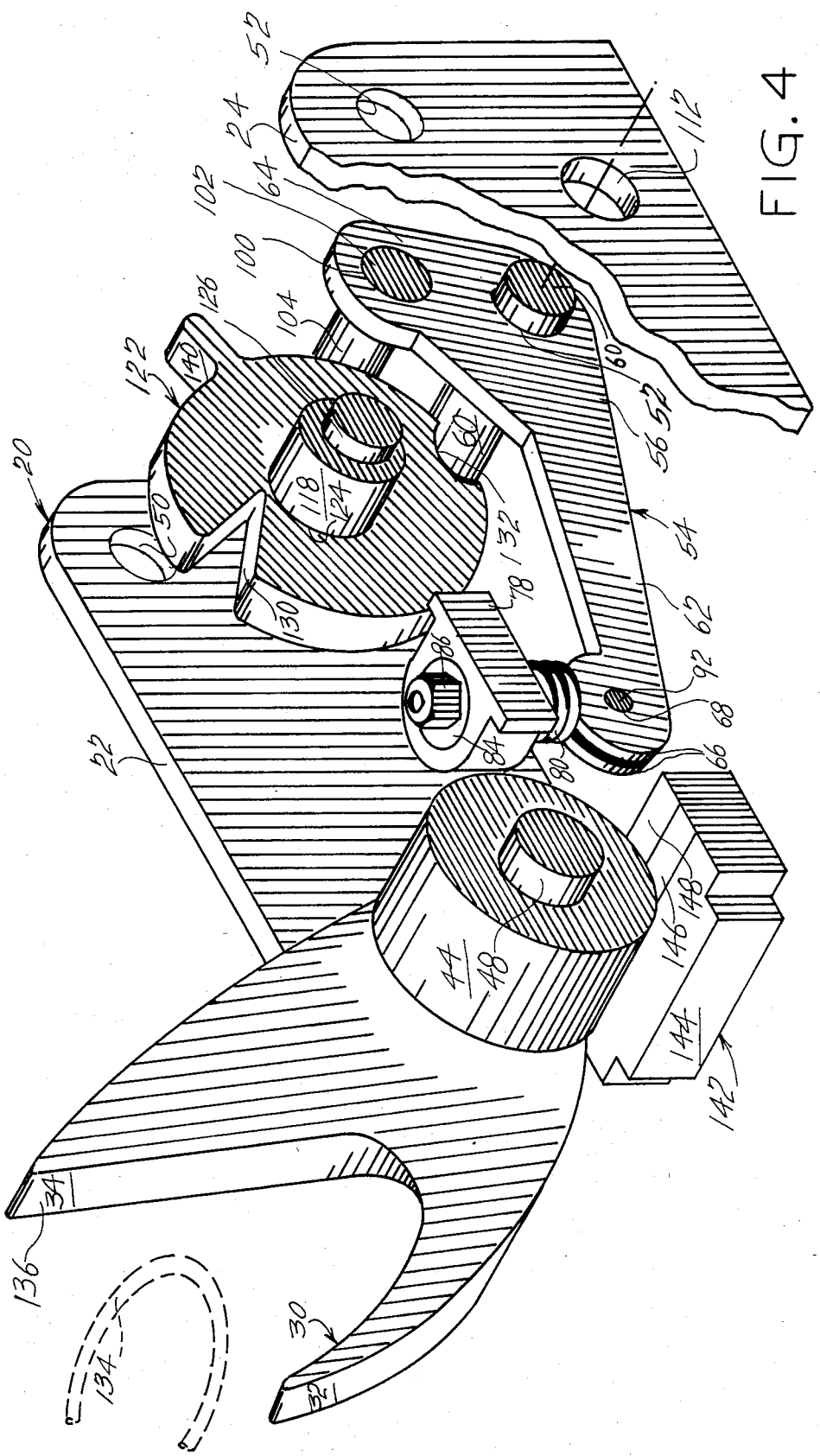
FIG. 4 is a fragmentary exploded perspective view of the hook after it has been released so as to release the line associated with the hook.

With reference to the drawings it is seen that the invention comprises a release hook 20 having a frame comprising a first side plate 22 and a second side plate 24.

With respect to FIGS. 1 and 2 and the upper left part of FIGS. 1 and 2 it is seen that in the first side plate 22 there is a first passageway 26. In the second side plate 24 there is a second passageway 28.

There is a rotatable hook 30 having a hook portion 32 and a main body portion 34. Also, the hook 30 has a flat surface or a bumping surface 36.

In the hook 30 there is a passageway 38.

There is a boss 40 welded to the hook 30. The boss 40 has a passageway 42 and is between the hook 30 and the first side plate 22.

There is a boss 44 welded to the hook 30. The boss 44 has a passageway 46 and is between the hook 30 and the second side plate 24.

A shaft, viz., a bolt, 48 extends through the passageway 26, passageway 42, passageway 38, passageway 46 and passageway 28, so that the hook 30 can rotate on the shaft 48.

In FIG. 1 and 2 it is seen that near the lower right part of the plates 22 and 24 that there are passageways. In plate 22 there is a passageway 50. In plate 24 there is a passageway 52.

There is a pawl 54 having a body portion 56. In the body portion 56 there is a passageway 58.

A shaft 60 extends through the passageway 50, through the passageway 58 and through the passageway 52. The shaft 60 may be a bolt.

The pawl 54 has a first arm 62 and a second arm 64.

The first arm 62 terminates in a clevis 66. In the two parts of clevis 66 there are aligned, passageways 68.

There is a rod 70 which terminates on its lower end in an eyelet 72. In the eyelet 72 there is a passageway 74.

On the lower end of the rod 70 and bearing against the eyelet 72 is a washer or washer 76.

There is an adjustment block 78.

There is positioned between the adjustment block 78 and the washer 76 a tension spring 80.

The adjustment block 78 is internally threaded 82. There is a nut 86. The nut 86 is welded to the upper surface of the screw 84 by weld 88.

The upper end of the rod 70 is free to move in the center of the screw 84.

Figure 5:
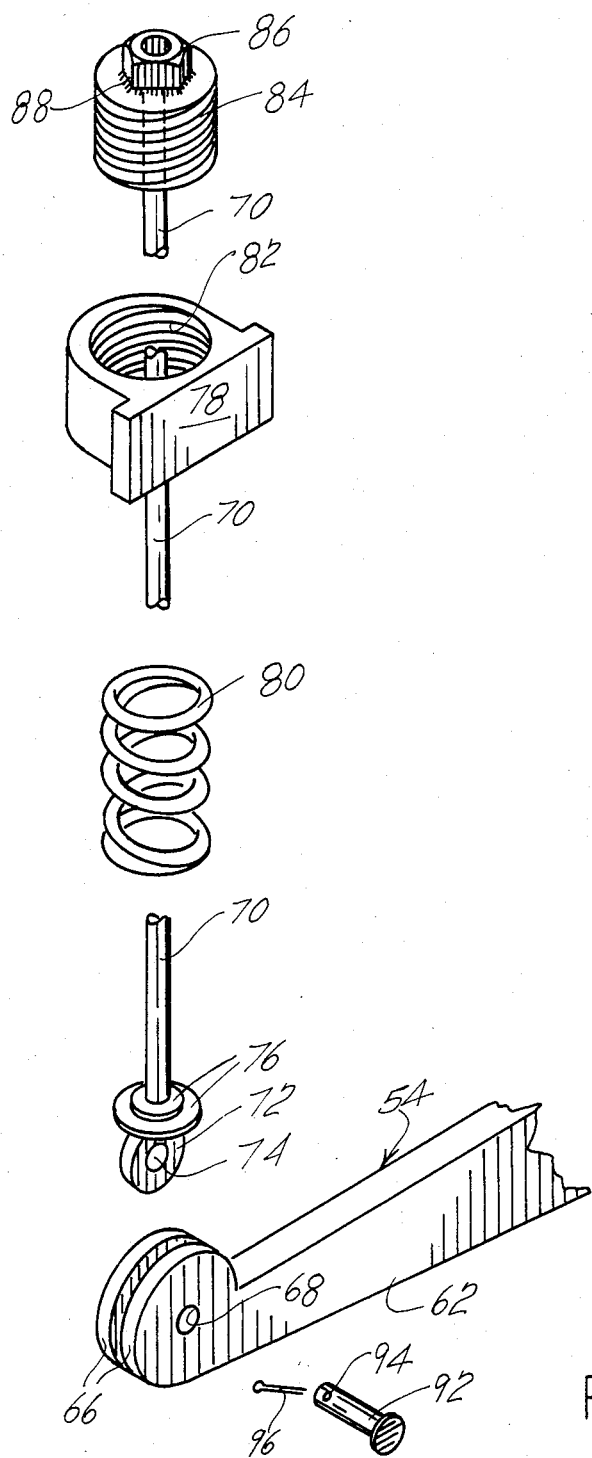
FIG. 5 is a fragmentary exploded perspective view of the means for applying pressure so as to restrict the movement of the hook.

In FIG. 5 it is seen that there is a brake-pin 92. The brake-pin 92 projects through the hole 68 in the clevis 66 and also through the hole 74 in the eyelet 72. In this manner the lower end of the rod 70 is positioned with respect to the outer part of the first arm 62. The end of the brake-pin 92 may have a passageway 94 for receiving a cotter key 96 to position the brake-pin in the hole 68.

The adjustment block 78 is welded at 98 to the upper inner surface of the second plate 24.

There is a passageway 100 near the outer end of the second arm 64. In the passageway 100 there is positioned a pin 102.

There is a roller 104 having a passageway 106. The roller is positioned on the pin 102. On the outer end of the roller 104 there is a plate 108.

It is seen in FIGS. 1 and 2 that at, approximately, the central part of said plate 22 there is a passageway 110. In side plate 24 there is a passageway 112 which is aligned with the passageway 110. There is a catch means, viz., a cam, 122. The catch means 122 has a passageway 124.

There is a boss 114 having a passageway 116. The boss 114 is welded to the catch means 122, and is between the catch means 122 and the first side 22.

There is a boss 118 having a passageway 120. The boss 118 is welded to the catch means 122, and is between the catch means 122 and the second side 24.

A shaft 126, i.e., a bolt, may be positioned in the passageway 110, the passageway 116, the passageway 120 and the passageway 124 so as to position the boss 114, the boss 118 and the catch means 122. In FIG. 2 it is seen that the boss 114 is between the first side plate 22 and the catch means 122. Also, it is seen that the boss 118 is between the second side plate 24 and the catch means 122.

It is seen that the catch means 122 has a first recess 130 and a second recess 132. The main body portion 34 of the hook 30 terminates in an end portion 136.

In the locked position, viz., with the line being in the bight of the hook and being positioned by the hook 30 the end 136 is in the first recess 130, FIG. 3. Also, the roller 104 is in the recess 132.

The position of the screw 84 in the internally tapped adjustment block 78 determines the pressure of the tension spring 80 on the arm 62 of the pawl 54. If the pressure of the spring 80 is a high pressure on the end of the first arm 62 it will be more difficult to rotate the catch means 122 so that the recess 132 rotates away from the roller 104 as compared to the situation when the tension-spring 80 is, relatively, loose from the end of the first arm 62 so that the tension spring 80 does not exert a great deal of pressure on the end of the first arm 62. In the latter situation the catch means 122 can move or rotate so that the recess 132 can, relatively, easily move away from the roller 104. From this it is seen that the pressure exerted by the tension spring 80 on the end of the first arm 62 of the pawl 54 determines, to a degree, the tension required in the line 134 so that the hook 30 can cause the catch means 122 to move and rotate away from the roller 104 so that the end portion 136 is released from the first recess 130.

On the catch means 122 there is a lobe 140. The function of the lobe 140 is to allow a person to manually rotate the catch means 122 so that the second recess 132 is receiving the roller 104. More particularly, the end portion 136 of the hook 30 can be rotated so as to be close to the first recess 130. Then the lobe 140 can be rotated so that he first recess 130 receives the end portion 136 and the second recess 132 is receiving the roller 104. In this position the hook 30 is locked and is ready to receive the line 134.

In FIGS. 1 and 3 it is seen that near the lower central left part that there is a bumper block 142. The bumper block 142 comprises metal plates 144, a cushion such as a rubber insert 146 and then metal plates 148. The bumper block 142 may be attached to the inside surfaces of the plates 22 and 24 by positioning in the receiving recess 151 and by means of a welded stop plate at the edge of recess 151.

When the tension on the line 134 exceeds the pressure of the tension spring 80 on the end of the first arm 62 the hook 30 will rotate. Generally, the hook 30 rotates with considerable velocity. With the bumper block 142 positioned on the frame the bumping surface 36 of the hook 30, when rotating, will strike the bumper block 142. This cushions the rotation of the hook 30. Without the bumper block 142 the hook 30 could rotate until damage could be done, possibly, to the catch means 122 by the end portion 34 striking the catch means 122.

The hook 30 is mounted on a mounting bracket 160. The mounting bracket 160 comprises the base 162, an upright standard 164, a right circular cyclinder, and a cap 166.

In the base 162 there is a passageway 168 and in the cap 166 there is passageway 176. The passageways 168 and 176 are aligned for receiving a pin 172.

There is a sleeve or tube 174 having a passageway 176.

The pin or bolt 172 is positioned in the passageway 168 in the base 162.

There is a cross head 178 which is welded at a 180° to the upper part of the sleeve 174. In the cross head 178 there is a central passageway 182.

A shaft or bolt 184 is positioned in the hole 186 in the side plate 22, the central passageway 182 and the hole 186 in the first side plate 22.

It is seen that the hook 30 can rotate horizontally in a first direction around the pin 172. Also, the hook 30 can rotate vertically in a second direction around the shaft or pin 184. The first direction and the second direction are at, substantially, right angles to each other.

On the lower part of the sleeve 174 there is a bumper 187. When the hook 30 rotates vertically and then rotates downwardly the rear faces or rear edges of the plates 22 and 24 strike the bumper 187 so as to be stopped in their rotation.

In FIGS. 1 and 2 it is seen that there are a number of upright support braces 189 connecting with the upright standard 164 and also the base 162 and the cap 166. Further, it is seen that there are three bolt holes 190 in the base 162 so as to be able to attach the hook 30 to a dock or other support such as an oil well platform or the deck of a boat. It is to be understood that the base 162 may be attached other than by a bolt to a dock or to a oil well platform or the deck of a boat. The base 162 maybe welded to the dock or to the oil well platform or the deck of a boat.

One of the ways of setting the release hook 30 so as to vary the tension on the line 134 to trip the release hook 30 is by means of the tensioning spring 80. The postioning of the screw 84 in the adjustment block 78 and the pressure placed on the tension spring 80 in this manner determines, partially, at what tension, in the line 134, the hook 30 will trip and rotate so as to allow the line 134 to escape. Another way of varying the tension, required by the line 134 to trip the hook 30, is by the catch means 122. In FIGS. 3 and 4 there is illustrated one catch means 122.

Figure 8:
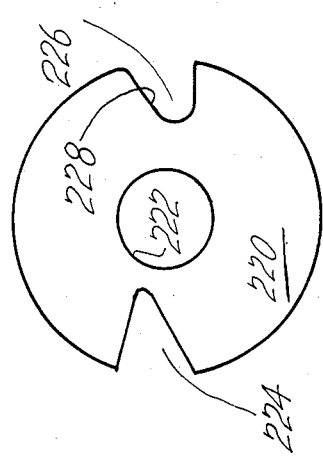
FIGS. 6, 7 and 8 are side elevational views of three different catch means or cams employed to restrict the movement of the hook.
Figure 7:
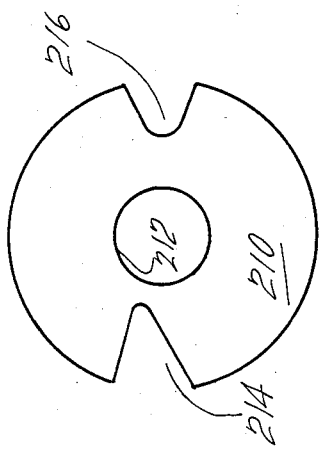
Figure 6:
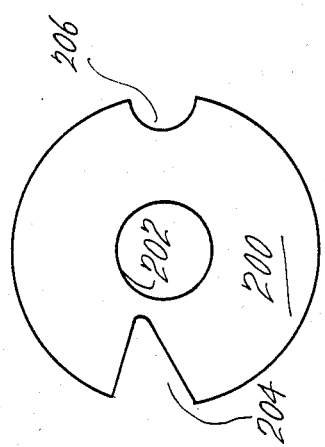
Figure 9:
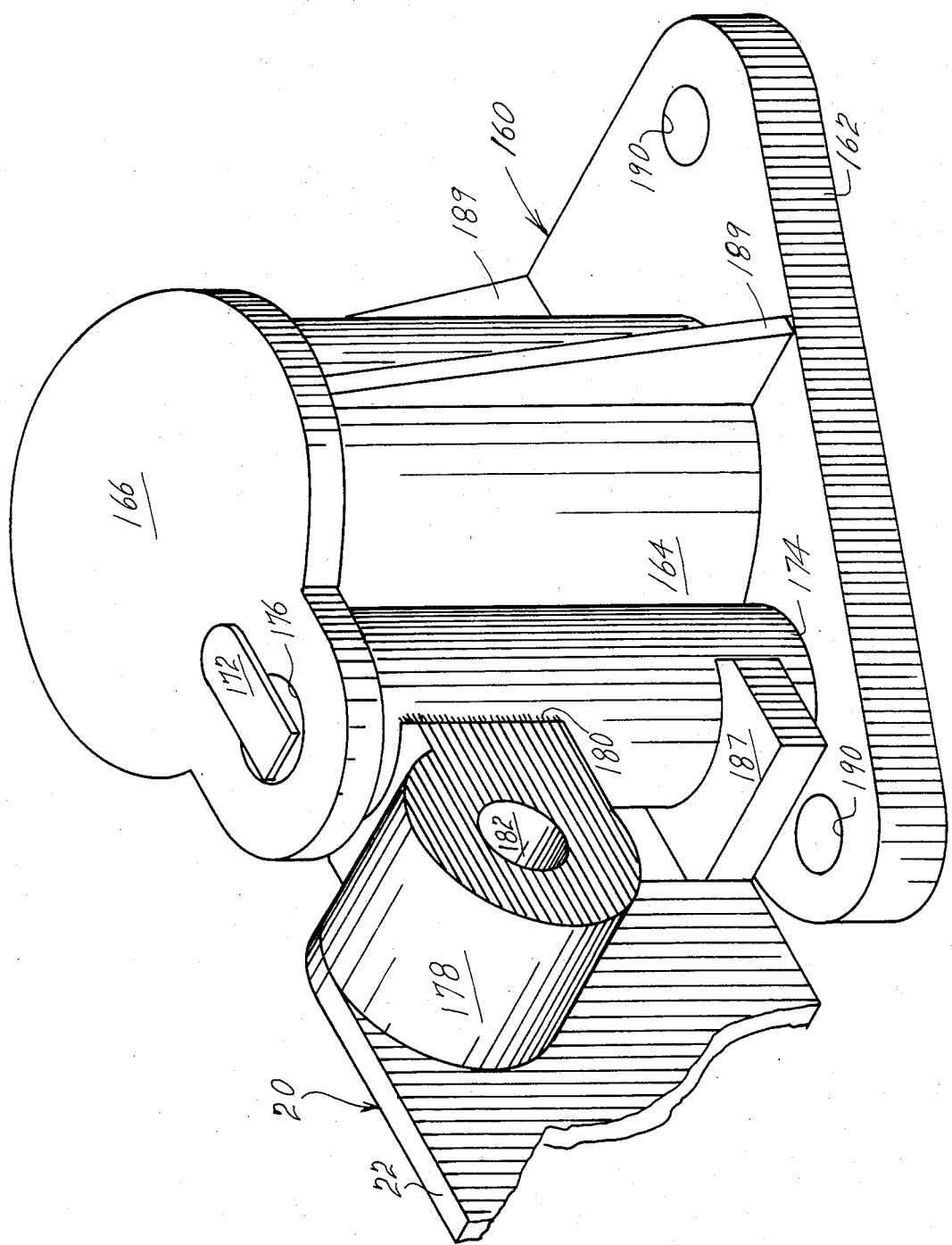
FIG. 9 is a fragmentary perspective view illustrating the mounting bracket and part of the frame connecting with the cross head of the mounting bracket.

In FIGS. 6, 7 and 8 there is illustrated other catch means with different recesses. These different recesses play a role in the tripping of the hook 30. With different recesses in the catch means the tension required in the line 134 to trip the hook will vary. For example, in FIG. 6 there is illustrated a catch means 200 having a central passageway 202. This catch means has a first recess 204 for receiving the end portion 136 of the hook 30. There is a second recess 206 for positioning next to the roller 104. The second recess 206 and its shallow depth indicates that the tension required in the line 134 to trip the hook 30 may be a, relatively, small tension.

As contrasted with catch means 200 there illustrated in FIG. 7 a catch means 210 having a central passageway 212. There is a first recess 214 for receiving the end portion 136. There is a second recess 216 for co-acting with the roller 104. The deep inset of the second recess 216 indicates that the tension required in the line 134, to trip the hook 30, can be quite a high tension and therefore the hook 30 may not trip at a low tension in the line 134.

In FIG. 8 there is illustrated a catch means 220 having a central passageway 222. There is a first recess 224 for receiving end portion 136 of the hook 30. There is a second recess 226 for co-acting with the roller 104. It is seen that in the recess 226 that there is an edge 228 which defines quite a large opening in the recess 226. Therefore, the tension in the line 134, to trip the hook 30, will be less with the catch means 220 as compared with the catch means 210, because of this wide angle and sloping surface 228, and the tension will be less as compared with the catch means 200.

In essence, it is seen that there are at least two ways to vary the tension required in the line 134 to trip the hook 30. One of these ways is the pressure applied by the tensioning spring against the end of the first arm 62 of the pawl 54. The other way is by means of a catch means and the second recess such as recess 132, or recess 206 or recess 216 or recess 226. This variation in the required tension in the line 134 to trip the hook 30 makes it possible to use one releaseable hook 20 in many different locations and for many different uses.

Figure 11:
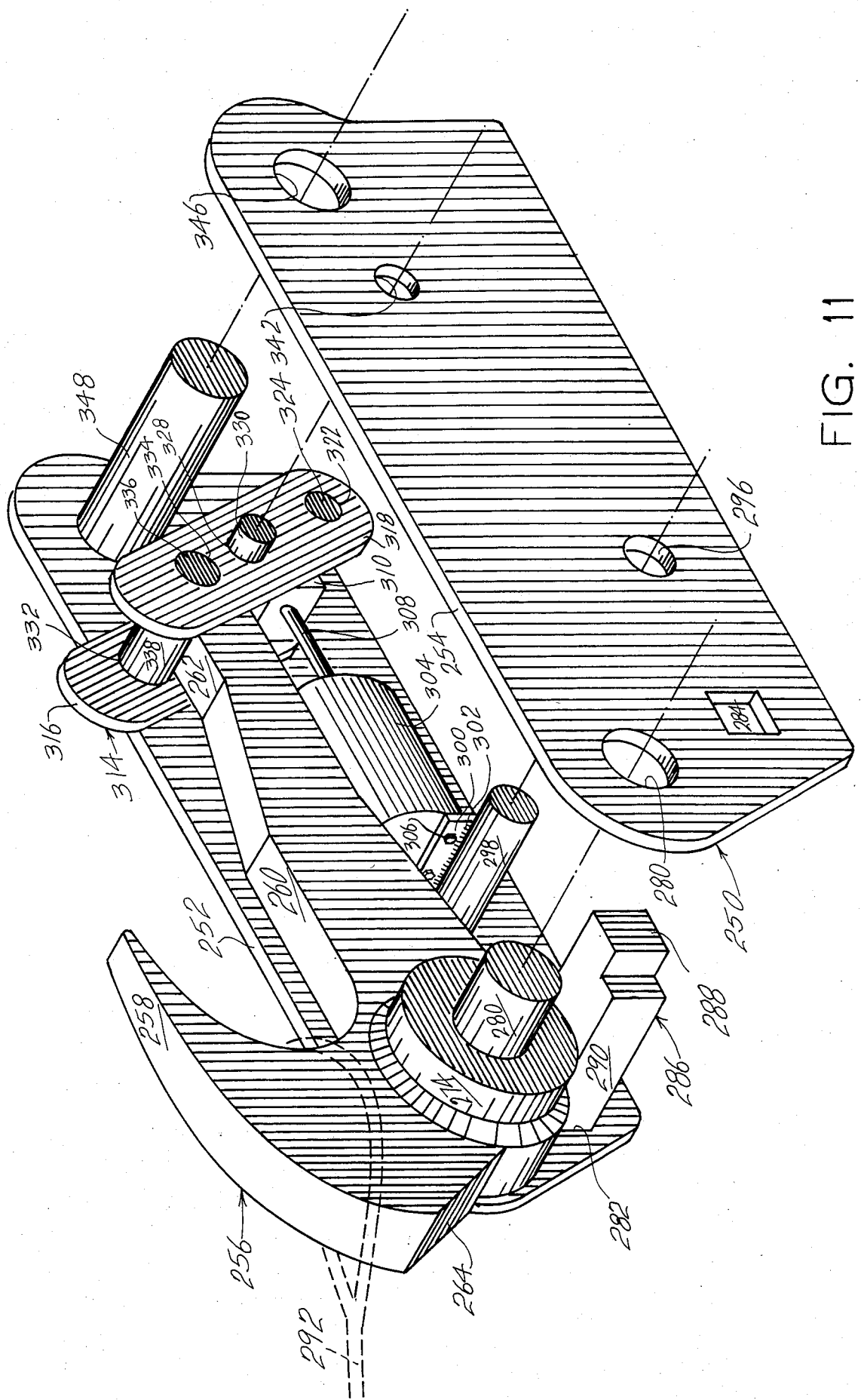
FIG. 11 is a fragmentary exploded perspective view illustrating the hook locked into a position to retain a line on the hook.

With reference to FIG. 11 it is seen that there is a releaseable hook 250.

This hook comprises a frame having a first side 252 and a second side 254. Also, the releaseable hook 250 comprises a hook 256 having a hooked portion 258, a main body portion 260, and an end portion 262. In FIG. 11 it is seen that the hook 256 has a flat surface or a bumping surface 264.

Figure 10:
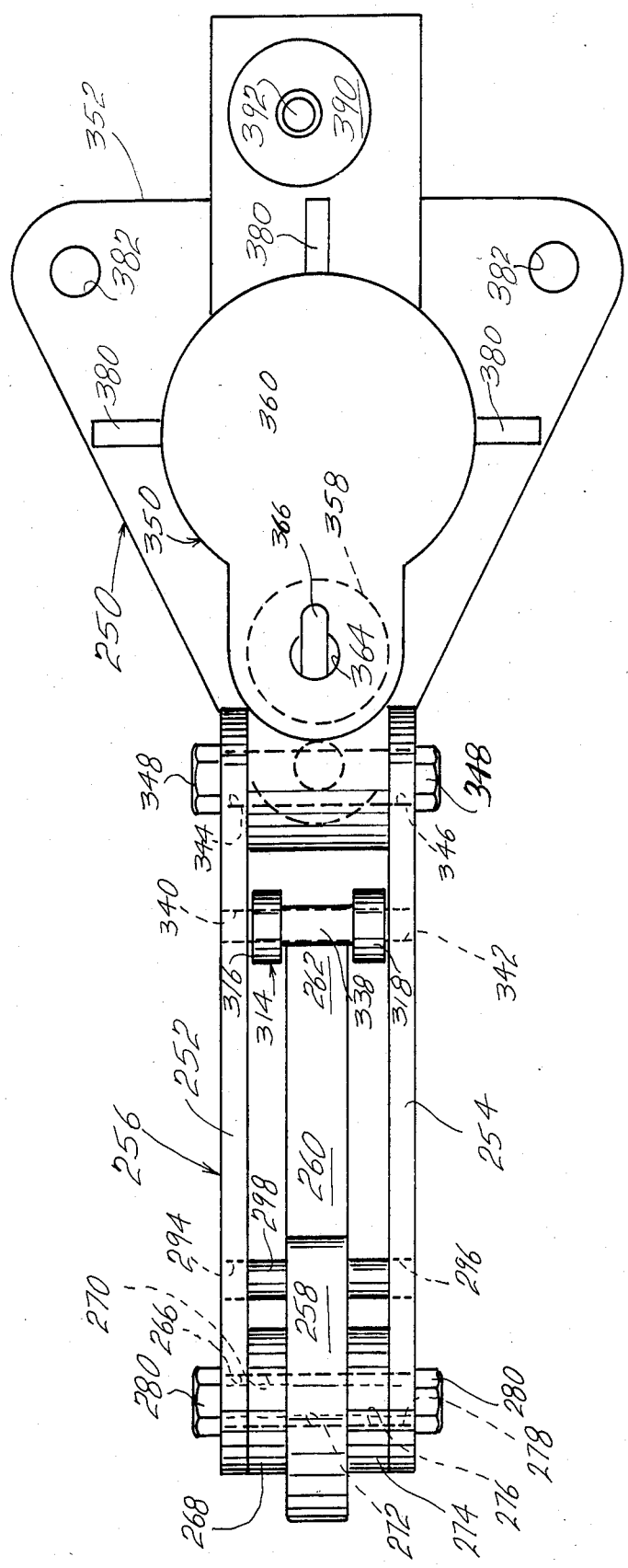
FIG. 10 is a plan view of another species of the invention, and, in particular, a hydraulically controlled releaseable hook having a yoke.

In the first side 252 there is a passageway 266, see FIG. 10. This passageway 266 is near the left part of the side.

There is a boss 268 having a passageway 270. The boss 268 is welded to the hook 256.

The hook 256 has a passageway 272.

There is a boss 274 having a passageway 276. The boss 274 is welded to the hook 256.

In the second side 254 there is a passageway 278.

The passageways 266, 270, 272, 276 and 278 are aligned to receive a first shaft or bolt 280. In FIG. 10 it is seen that the boss 268 is positioned between the hook 256 and the first side 252 and that the boss 274 is positioned between the hook 256 and the second side 254.

The hook 256 is capable of moving and rotating on the first shaft 280.

There is positioned in the sides, and below the passageways 266 and 278, a passageway or opening 282 in the side 252 and a passageway or opening 284 in the side 254. The openings 282 and 284 are of a square or rectangular configuration.

Figure 12:
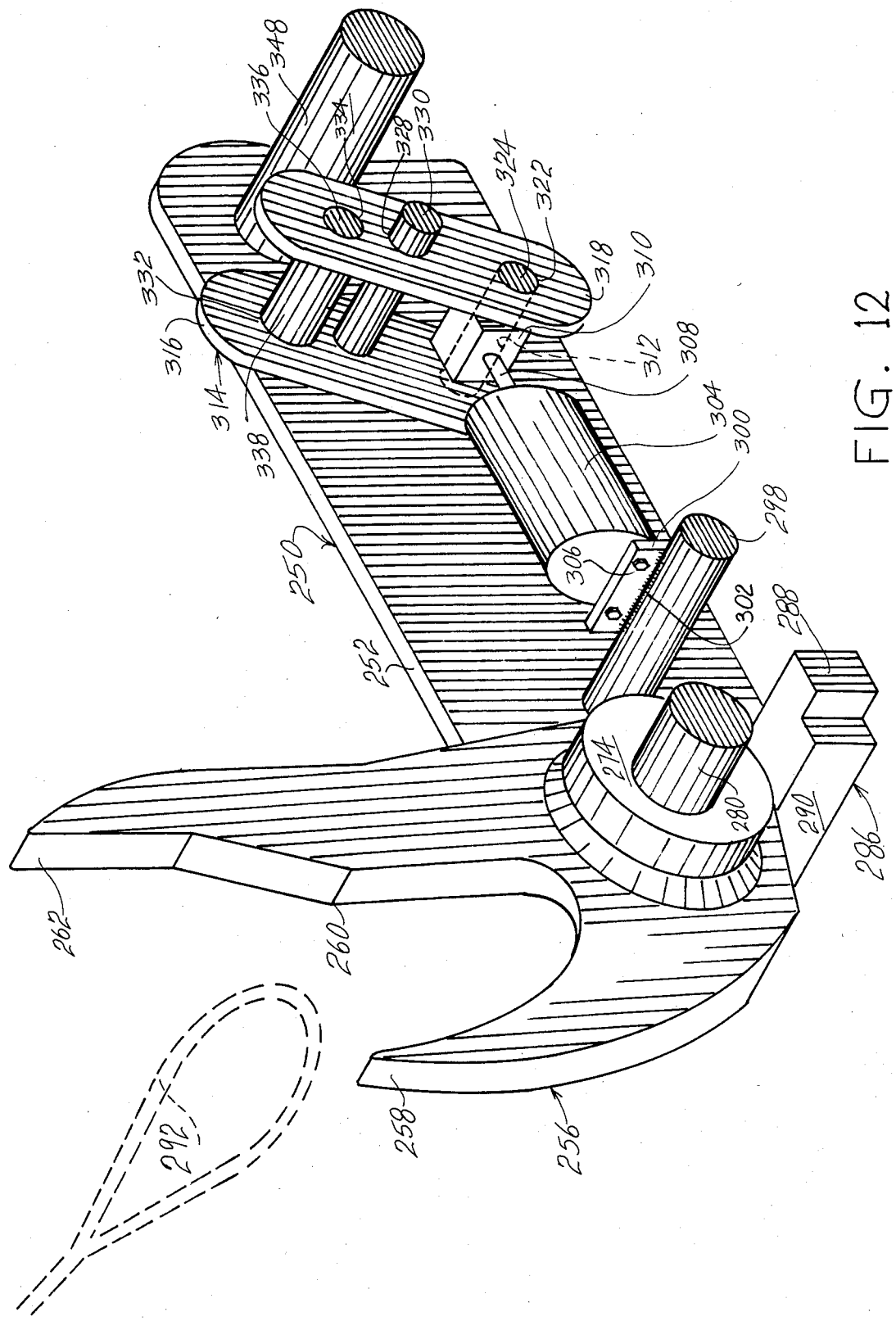
FIG. 12 is a fragmentary perspective view looking at the hook after it has been tripped and with the line ready to be released from the hook.

There is a bumper 286. The bumper 286 has a main body portion 288 which is in a square or rectangular configuration. On the front of the body 288, see FIGS. 11 and 12, there is a striking plate 290. The ends of the main body portion 288 can be passed into or inserted into the openings 282 and 284.

With the tripping of the hook and the release of the line 292 the hook 256 rotates. The flat surface of the bumping surface 264 strikes the striking plate 290 of the bumper 286. In this manner the rotation of the hook is stopped.

The hook bumper 286 is made of steel. It has a neoprene plastic cushion between plates of steel.

To the right of the openings 282 and 284 there is a passageway 294 in the first side 252 and a passageway 296 in the second side 254. A tie cylindrical support rod 298 is positioned in the passageways 294 and 296. This cylindrical support rod 298 functions does not add rigidity as a support for brace 300. The brace 300 is welded to the rod 298 by weld 302. The support rod 298 is a pin for attaching brace 300 and to allow the cylinder to rotate slightly around 298 as the yoke is opened.

There is a hydraulic cylinder 304. The hydraulic cylinder is attached to the brace 300 by cap screws 306. The cylinder is bolted to the brace 300.

The hydraulic cylinder 304 comprises a ram 308. The ram 308 connects with a connecting block 310. In the connecting block 310 there is a passageway 312.

There is a yoke 314 having a first side 316 and a second side 318.

Near the lower part of the first side 316 there is a passageway 320. Near the lower end of the second side 318 there is a passageway 322.

In the passageways 320 and 322 there is a first shaft 324.

The connecting block 310 is positioned on the first shaft 324 with the first shaft 324 being in the passageway 312. The connecting block 310 and the first shaft 324 are free to move and rotate with respect to each other.

In the middle portion of the first side 316 there is a third passageway 326.

In the middle part of the second side 318 there is a fourth passageway 328.

The passageways 326 and 328 are aligned and a shaft 330 is positioned in these two passageways. The first side 316 and the second side 318 are free to rotate on the second shaft 330. In other words, the yoke 314 is free to rotate on the shaft 330.

Near the upper end of the first side 316 there is a fifth passageway 332.

Near the upper end of the second side 318 there is a sixth passageway 334.

The passageways 332 and 334 are aligned. A shaft 336 is positioned in these two passageways. A roller 338 is positioned on the shaft 336. The roller 338 is free to move and rotate around the shaft 336.

In the first side 252 and near the upper part and the rear part there is a passageway 340.

Also, in the second side 254 and in the upper part and near the rear there is a passageway 342. The passageways 340 and 342 are aligned.

The shaft 330 is positioned in the passageways 340 and 342. The shaft 330 may be a bolt.

At the rear upper part of the first side 252 there is a passageway 344.

At the upper part of the second side 254 there is a rear passageway 346.

The passageways 344 and 346 are aligned. A shaft or a bolt 348 is positioned in these passageways.

There is a mounting bracket 350 having a base 352. The base 352 is in a, generally, triangular configuration.

There is an upright standard 354 which is welded to the base 352 at weld 356.

There is a sleeve 358.

There is a cap 360 which is mounted on top of the upright standard 354 and sleeve 358.

In the base 352 and near the releaseable hook 250 there is a passageway or recess 362. In the upper cap 360 there is a passageway 364.

In the passageways 362 and 364, and running through the sleeve 358, there is a pin 366. The sleeve 358 is free to rotate around the pin 366. The pin 366 may be considered to be a shaft 366.

On the front of the sleeve 358 there is an adapter 370. The adapter 370 has a horizontal passageway 372. The adapter 370 is welded at 374 to the sleeve 358.

The passageways 344, 372 and 346 are aligned to receive the pin or bolt 348.

The crosshead 370 is on the upper part of the sleeve 358.

Also, on the front part of the sleeve 358 and on the lower part of the sleeve there is a bumper 375 having a striking surface 376. The bumper is welded at 378 to the front part of the sleeve.

It is seen that the pin 366 and the sleeve 358 allow the releaseable hook 250 to rotate in a first direction, viz., in a horizontal direction. It is seen that the crosshead 370 and the sides 252 and 254 and the pin 348 allow the releaseable hook 250 to rotate in a second direction, viz., in a vertical direction.

It is seen that the first direction and the second direction are, substantially, at right angles to each other, with one direction being horizontal and the other direction being vertical.

There are a multiplicity of braces 380 connecting with the upright standard 354 and the base 352.

Also, there are three passageways or holes 382 near the corners of the base 352. These passageways 382 make it possible to attach the mounting bracket 350 to a deck of a boat or to an oil well platform or a dock or a barge by means of bolts or other suitable attaching means.

The bumper 374 serves the purpose that when the releaseable hook 250 rotates vertically and comes down or rotates downwardly that the rear of the sides 252 and 254 strike the striking surface 376 of the bumper 374 so as to stop the vertical rotation.

The fluid actuated cylinder 304 and the ram 308 are actuated by the fluid pump 390. The fluid pump 390 is a hand operated pump having a handle 392.

There is an accumulator 394.

A pipe 396 connects with the pump 390 and also connects with the tee 398. The accumulator connects with the tee 398.

There is a check valve 400.

A pipe 402 connects with the tee 398 and with an elbow 404. The elbow 404 connects with the pipe 406 which, in turn, connects with the check valve 400.

The purpose of the accumulator 394 is to allow the hand pump 390 to build a fluid pressure in the accumulator 394. With the accumulator 394 it is possible to hold the fluid pressure in the system for as long as one month without having to use the hand pump 390.

The purpose of the check valve 400 is to allow fluid to flow from the hand pump 390 and the accumulator 394 to the fluid actuated cylinder 304. The check valve 400 is a one-way valve and does not permit fluids to flow from the fluid cylinder 304 to the hand pump 390 or to the accumulator 394.

The check valve 400 connects with the pipe 408 which in turn connects with the tee 410. One leg of the tee 410 connects with the cross 414.

The cross 414 connects with a pipe 416 which connects with the fluid actuated cylinder 304.

There is a relief valve 418. The relief valve 418 connects with the cross 414 by means of pipe 420.

The relief valve connects with the pipe 422 which in turn connects with an elbow 424. The elbow 424 connects with the pipe 426 which connects with a tee 428. The tee 428 connects with a pipe 430 which connects with a needle valve 432. A pipe 434 connects with the tee 410 and also with a needle valve 432.

A pipe 436 connects with an elbow 438. The elbow 438 by means of a pipe 440 connects with a resevoir 442. The resevoir 442 connects with the hand pump 390 by an opening or passageway 444.

The pipe 416 connects with the cross 414 and elbow 446. In turn the elbow 446 connects with the cylinder 304.

There is a pressure gauge 450. A pipe 452 connects with the cross 414 and the pressure gauge 450.

On the relief valve 418 there is a control knob 448 for setting the relief valve. The relief valve, by means of the control valve 448, can be set to allow fluid to flow from the cylinder 304, when the pressure on the ram due to the tension in the line 292, exceeds the pre-set pressure. The relief valve allows the fluid to flow from the cylinder 304 to the reservoir 442.

Figure 13:
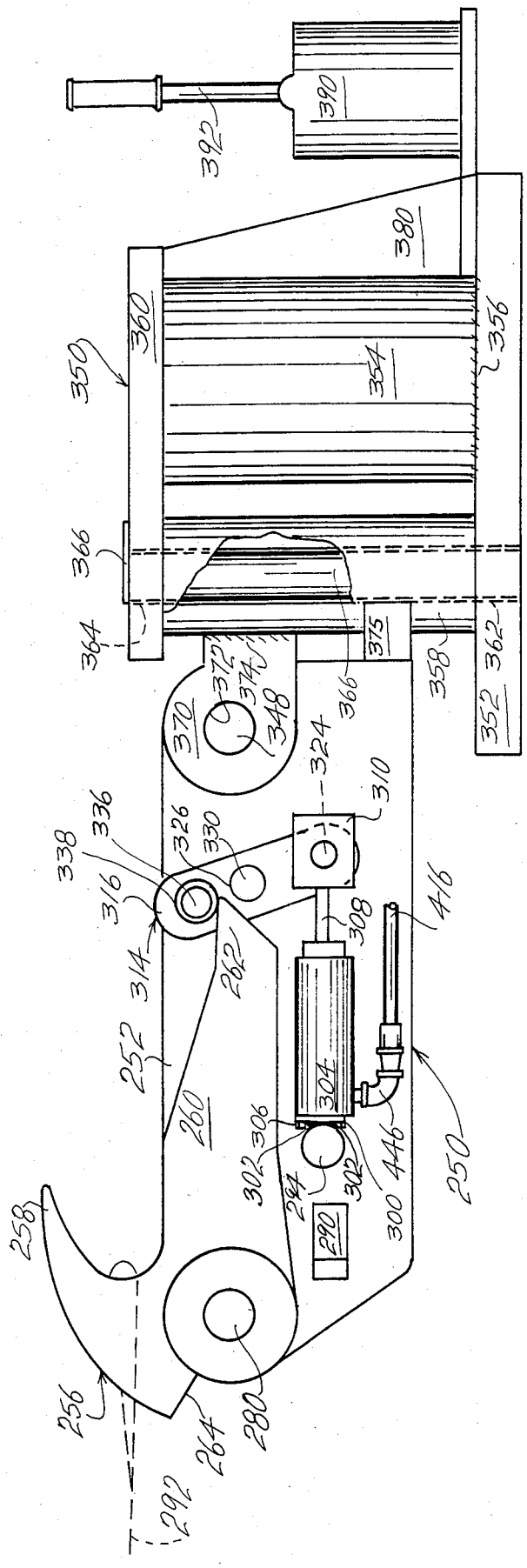
FIG. 13 is a fragmentary side elevational view looking at the hook and with the end portion locked into the yoke so that the line is positioned on the hook and the hook cannot move.

In operation the needle valve 432 is closed. The end portion of the hook 256 is positioned in the yoke 314 so that the roller 338 is above the end portion 262. The hook 256 is in a horizontal position, see FIGS. 11 and 13. The end portion 262 of the hook may bear against the roller 338.

The pump 390 is pumped to increase the pressure in the cylinder of 304. This extends the ram 308 so as to rotate the yoke 314 to, positively, position the roller 338 over the end portion 262 and to prevent the end portion 262 from rotating, at this time. Again, the needle valve 432 must be closed. The knob 448 is adjusted so as to set the relief valve at a desired tripping pressure. The relief valve may be set so that the desired tripping pressure is two ton or four thousand pounds of pressure or load on the hook or maybe twenty-five tons or fifty thousand pounds of pressure or load in the hook.

Figure 14:
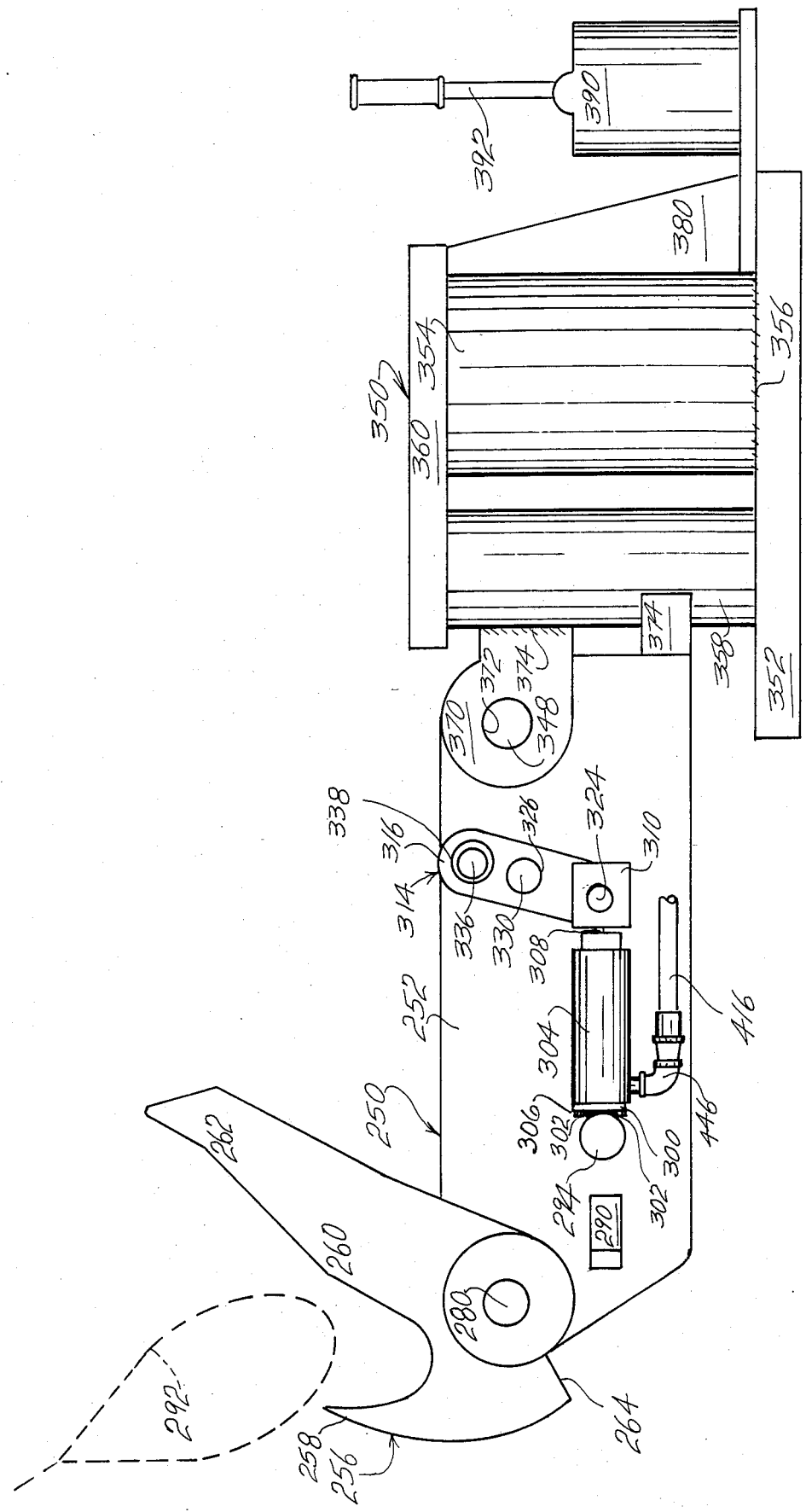
FIG. 14 is a fragmentary side elevational view illustrating the hook after the hook has tripped and is ready to move so as to allow the line to escape from the hook.
Figure 15:
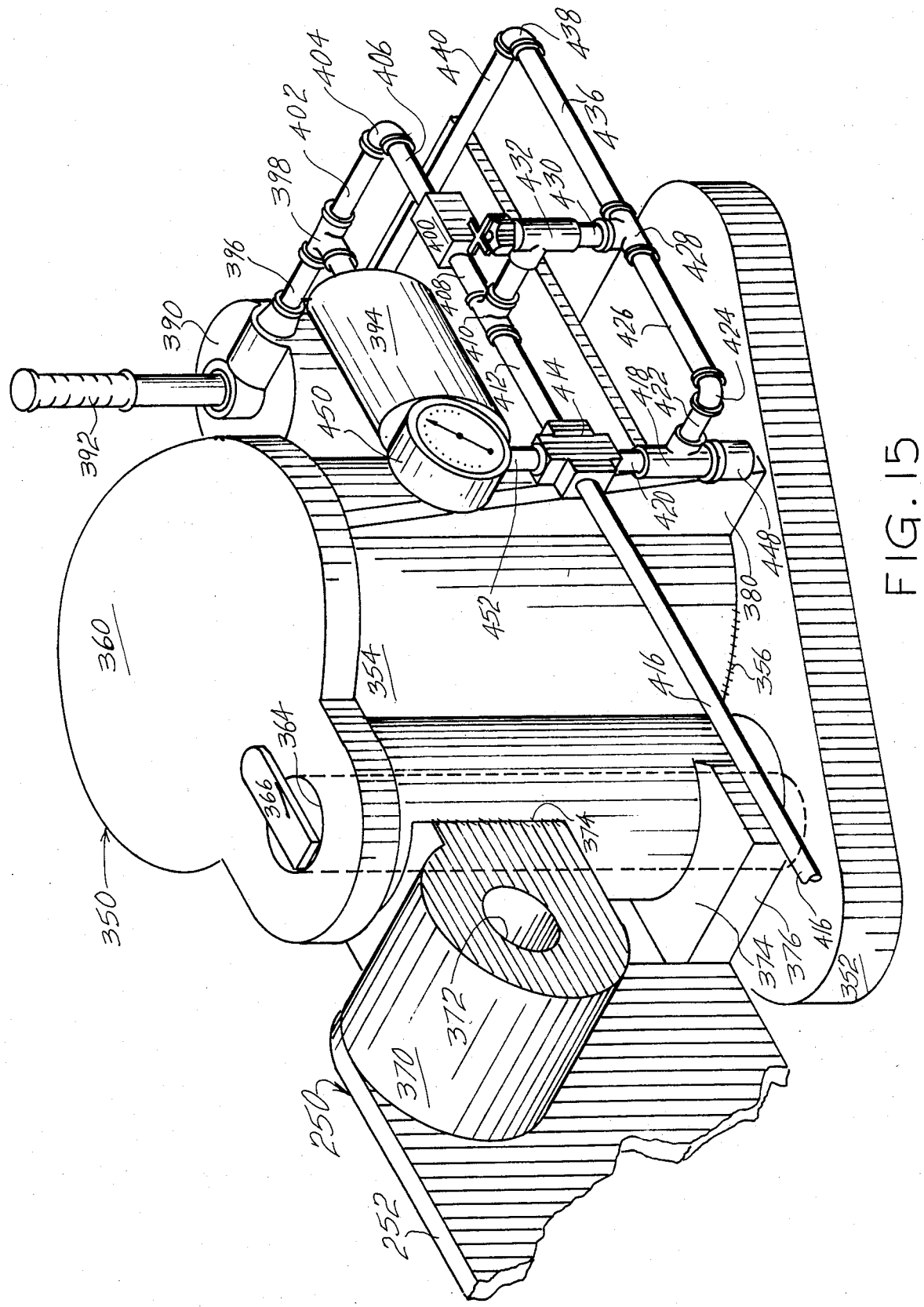
FIG. 15 is a fragmentary perspective view illustrating the hydraulic unit for actuating the hydraulic ram and also for illustrating the mounting bracket for the hook; and, FIG. 16 is a schematic view of the hydraulic system for actuating the hydraulic ram and for preventing the movement of the hook.
Figure 16:
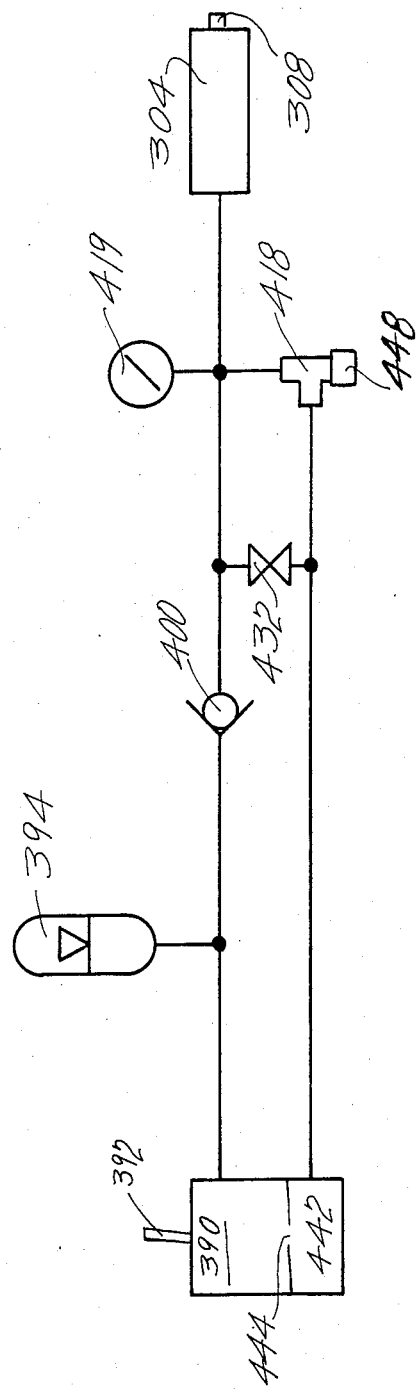

The line 292 is place in the hook 256. When the tension on the line 292 exceeds the desired pressure in the hydraulic system and in the cylinder 304 the yoke 314 will rotate. With the rotation of the yoke 314 the ram 308 is forced into the cylinder 304 to increase the pressure in the hydraulic system. Since the pressure in the hydraulic system exceeds the desired pressure set in the relief valve 418 the hydraulic fluid flows from the cylinder 304, thru the relief valve 418 and to the reservoir 442. Also, the yoke 314 has rotated and the hook 256 has rotated so as to allow the line 292 to escape, see FIGS. 12 and 14. In this manner it can be seen that the hook 256 functions as a safety release hook. For example, if a fishing boat has nets which are caught on the bottom and the pressure in the hydraulic system has been set at a certain desired pressure and the tension on the line 292 forces the pressure in the hydraulic system to exceed this desired pressure then the yoke 314 will rotate and the hook 256 will rotate to release the line 292. As a result the fishing nets are not torn and damaged. A diver can descend in the water and release the fishing nets from the objects which the fishing nets are entangled such as a formation in the water or a sunken ship or sunken object.

To reset the hook 256 the needle valve 432 is opened so as to allow the pressure in the system to decrease and to flow to the reservoir 442. Then, the needle valve 432 can be closed and the above stated steps can be repeated to reset the hook for receiving the line 292.

RESUME

From the foregoing it is seen that I have provided a releaseable hook 30 having a hook portion 32 and a main body portion 34.

There is a catch means 122 having a first recess 130 for receiving the end 136 of the hook 30. Also, the catch means 122 has a second recess 132 for coacting with the roller 104.

There is a pawl 54. The pawl 54 has a second arm 64. The roller 104 is positioned in the second arm 64. Also, the pawl 54 has a first arm 62. A tensioning spring 80 bears against the outer end of the first arm 62.

In operation the end 136 of the hook 30 is positioned in the first recess 130 of the catch means 122. Also, the second recess 132 is positioned over the roller 104. The line 134 is placed in the hook to secure a bolt or a barge or other device, such as a fish net, to the hook. One way of adjusting the tension required in the line 134 to trip the hook 30 is by means of the tensioning spring 80 and the pressure it places on the end of the first arm 62 of the pawl 54. Another way of adjusting tension required in the line 134 to trip the hook 30 is by means of the first recess 130 and by means of the second recess 132. It is seen that there are three ways to adjust the release hook 20 so that a different tension is required in the line 134 to trip the hook 30. One of these ways is by the tensioning spring 80. A second way is by the size and configuration of the first recess 130. A third way is by the size and configuration of the third recess 132.

In operation the hook 30 functions as follows. A line 134 is positioned in the hook with the hook in the closed position, see FIG. 3. The line 134 pulls on the hook portion 32. In In FIGS. 3 and 4 it is seen that when the tension on the line 134 exceeds the tripping tension the hook 30 rotates in a counter clockwise direction. The end 136 of the main body portion 34 is in the first recess 130. When the line 134 pulls on the hook and exceeds the predetermined tension the end 136 will cause the catch means 122 to rotate around the shaft 126, in a clockwise direction. With this rotation of the catch means 122 the end 136 of the hook is released so that the hook 136 can rotate in a counter clockwise direction around the shaft 48 to release the line 134.

The pawl 54 will rotate around the shaft 60 in a counter clockwise direction. The result of these rotations is the release of the line 134. It is seen that there is a hook 30 of a, generally, U-configuration having a hook portion 136 and a main body portion 34. There is a first catch means having a first means and a second means. The first means operatively connects with the said main body portion to position the hook. There is a tensioning means. The second means operatively connects with said tensioning means. When the tension on the line connecting with said hook exceeds the tension in the tensioning means or the pressure exerted by the tensioning means then the catch means moves to allow the first means and the main body portion of the hook to move with respect to each other to allow said hook to rotate to release the line which was under tension to the hook. In order for the hook to rotate the tension in the line must exceed the tension or pressure restricting the rotation of the hook. It is possible to make adjustments so as to require different tensions in the line connecting with the hook. This can be accomplished by the pressure of the tensioning means or the configuration in size of the first recess in the catch means or the configuration in size of the second recess in the catch means or a combination of the two or more variables.

At the present time I plan to use this releaseable hook for a tension up to approximately twenty-five ton. In this range of tension the release hook is about two feet long, about eight inches wide and about eleven or twelve inches high. Naturally, the release hook can be designed for larger tensions than twenty-five ton with a corresponding change in the dimensions of the release hook.

There is another species 256 of the hook. This species is a hydraulically actuated hook.

This species comprises a hook portion 258, a main body portion 216 and an end portion 262.

There is a yoke 314. A hydraulic cylinder 304 connects with the yoke by means of a ram 308.

There is a second shaft 330 which can be considered the shaft around which the yoke rotates.

There is a roller 338. The shaft 330 is positioned between the connection of the ram with the yoke and the roller 338.

The hook 256 can be positioned so that the end portion 262 is substantially horizontal and the roller 338 is over the end portion.

There is a hydraulic system for controlling the hydraulic cylinder 304. The hydraulic system comprises a hand pump 390.

The hand pump 390 can supply fluid to the hydraulic cylinder 304. To maintain the fluid pressure in the cylinder 304 there is an accumulator 394.

In the hydraulic system there is a relief oil valve 418.

The hydraulic hand pump 390 can be actuated to supply fluid to the hydraulic cylinder 304. Also, the relief valve 418 can be set to a certain pressure.

The bight 292 of the line can be placed in the hook 256 with the yoke moved so that the roller 338 is over the end portion 262 of the hook 256. In other words the hook 256 is locked into a certain position to hold the line and the hook portion 292. The relief valve can be set so that if the pressure in the hydraulic cylinder exceeds a certain pressure the relief valve 418 will open to allow the fluid to flow the the reservoir 442 associated with the pump 390.

In operation the relief valve is set at a pressure at which the hook 256 should trip to release the line 292. For example, the hook can be rotated so that the end portion 292 is close to the yoke 314. The roller 338 is over the end 262 of the hook. Then, the handle 392 of the pump 390 can be moved so as to increase the pressure in the hydraulic cylinder 304. The relief valve 418 is set at the desired relief pressure. The end portion 292 of the line can be placed over the hook portion 258. If the tension on the hook portion 292 and the line exceeds the predetermined pressure determined by the relief valve setting the hook will move the yoke 314 so as to allow the hook to rotate to release the line 292. In this manner, if the fish net or line is caught on an object below the surface of the water, the hook automatically rotates at predetermined pressure so as to release the line and the hook portion of the line so as not to tear the net or to ruin the line.

From the foregoing it is seen that I have provided a hook 256 of a generally U-configuration having a hook portion 258 and a main body portion 260 terminating in an end portion 262. This hook is capable of moving or rotating. There is provided a locking means juxtapositioned to said end portion and adapted to be in a bearing relationship with said end portion to restrict movement of said hook. There is a means to apply a first pressure to said locking means to prevent movement of said hook until a second pressure applied to said hook results in a pressure on said locking means opposed to and at least equal to said first pressure to move said locking means to allow said hook to move. The locking means, when in a bearing relationship to said end portion, presents a member in the path of movement of said end portion and which member restricts movement of said end portion and said hook. Then, the second pressure applied to said hook results in a pressure on said locking means opposed to and at least equal to said first pressure so as to move said member and to allow said hook and said end portion to move.

In one species of the invention the locking means comprises a first catch means and a tensioning means. The first catch means has a first means and a second means. The first means operatively connects with the main body portion to position said hook. The second means operatively connects with the tensioning means. The catch means is moveable. The tensioning means applies pressure to said second means to apply said first pressure to said first means and to said first catch means to restrict movement of said hook.

In a second species the locking means comprises a yoke. The yoke is moveable. There is a means, juxtapositioned to said yoke and which means restricts the movement of the yoke. Further, there is a means to move said yoke to allow movement of said hook. Said yoke has a bearing member and which bearing member, when in a bearing relationship to said end portion, restricts movement of said end portion and said hook. When the second pressure applied to said hook results in a pressure on said end portion and said bearing member opposed to and at least equal to said first pressure so as to move said hook and said bearing member and to allow said hook and said end portion to move.

I consider my releaseable hook to be new as no operator is required to trip the hook and the hook trips automatically when the tension on the line exceeds the predetermined tension required to trip the hook. In this manner the hook is a safety hook.

I consider my invention to be useful as the releaseable hook can be used for mooring boats, ships and barges to docks and oil well platforms and for use with a fish net to release the fish net if the tension in the line exceeds a predetermined tension. Also, it can have other uses where there is required a predetermined tension and the tension on the line exceeds said predetermined tension.

I consider my releaseable hook to be unobvious as there is a straight forward design comprising, essentially, in one species, three moving parts, viz., a rotatable hook 30, a rotatable catch means 122 and a rotatable pawl 54, and, in another species a rotatable hook 256, a rotatable yoke 314 and a hydraulic cylinder 304 for controlling the yoke 314 and the hook 256. I do not know of another hook having such a straight forward design and which automatically trips when the tension in the line exceeds a predetermined tension placed on the hook.

In preparing this patent application I did not make a patent search.

From personal knowledge I can state that I have four U.S. patents for Releaseable Hooks. These are:

RELEASEABLE HOOK, No. 3,761,122 Issuing Date of Sept. 25, 1973;

RELEASEABLE HOOK, No. 3,762,757 Issuing Date of Oct. 2, 1973;

RELEASABLE HOOK, No. 3,811,720 Issuing Date of May 21, 1974; and

RELEASEABLE HOOK, No. 4,034,992 Issuing Date of July 12, 1977.

The references cited by the United States Patent Office in the prosecution of these four patents are as follows:

| Name | Number | Issuing Date |
| --- | --- | --- |
| ATTFIELD | 1,101,113 | 6/1914 |
| IRWIN | 1,242,809 | 10/1917 |
| SPECHTMEIR | 1,377,159 | 5/1921 |
| ANDERSON | 2,359,275 | 9/1944 |
| BINMORE | 2,714,731 | 8/1955 |
| SMITH | 2,858,161 | 10/1958 |
| MARRYATT | 2,864,644 | 12/1958 |
| STEPHENS | 2,896,955 | 7/1959 |
| HIMEL, JR. | 2,903,292 | 9/1959 |
| VOSS | 3,054,635 | 9/1962 |
| HAAS | 3,405,965 | 10/1968 |
| HILL | 3,436,795 | 4/1969 |
| JANSSEN | 3,610,674 | 10/1971 |
| EPSTEIN | 3,762,757 | 10/1973 |
| EPSTEIN | 3,811,720 | 5/1974 |
| CRISSY ET AL | 3,926,467 | 12/1975 |
| FR. BRITAIN PAT. SPEC. of EPSTEIN | 1,556,070 | 11/1979 |

I consider that the difference of my subject invention and the subjects of the patents cited in the prosecution is that with my invention the hook trips automatically when the tension in the line exceeds a predetermined tension or pressure set on the hook. An operator is not required to trip the hook. This hook of mine is essentially a safety release hook.

I consider my releaseable hook to have an advantage of being a safety release hook as when the tension in the line exceeds a predetermined tension set in the hook, the hook trips to release the line. Further, it is relatively easy to make adjustments in the hook and to have a, relatively, wide range of adjustments so that the hook will trip with a wide range of tension in the line, in one version for example, the tensioning spring and the pressure of the tensioning spring on the end of the first arm of the pawl can be adjusted. The size and configuration of the first recess in the catch means for receiving the end of the main body portion of the hook can be adjusted. A third adjustment is the size and configuration of the second recess in the catch means for receiving the roller attached to the second arm of the pawl. In essence, there are three means of varying the release hook so that the tension required to trip the hook can vary over a wide range. In another version there is a rotatable hook 258, a yoke 314 and a hydraulic cylinder 304 with a ram 308. The hook can be rotated so that the roller 338 of the yoke 314 can be placed over the end portion of the hook. Then the pressure can be increased in the hydraulic cylinder 304 so as to maintain the end portion 262 of the hook 256 in a set position. If the tension on the line 292 increases so as to be at lease equal to the pressure of the hydraulic cylinder on the relief valve 418 the relief valve will open and return hydraulic oil to the 442 and the hook 256 will trip the yoke 314 to move the yoke 314. With the tension on the line 292 or on the bight of the line 292 greater than the pressure in the hydraulic cylinder 304 the end portion 262 will force the yoke 314 to rotate so as to release the end portion 262 and to allow the hook 256 to rotate to release the line 292. Also, as the hook is composed of few moving parts and which parts can be readily manufactured, the hook is inexpensive to manufacture and also inexpensive to maintain in an operating state.

A potential customer may want to be certain that the hook performs and releases to his plans and specification. Therefore, I plan to test and to calibrate a hook before shipping to the potential customer.

For a twenty-five ton hook 256 the dimensions are a length of about two feet, a width of about eight inches and a height of about eleven or twelve inches. For a hook of larger than twenty-five ton capacity there can be corresponding change in dimensions.

From the foregoing and having presented my invention what I claim is:

1. A releaseable hook comprising:
  a. a hook of a generally, U-configuration having a hook portion and a main body portion terminating in an end Portion;
  b. said hook being capable of moving;
  c. a locking means juxtapositioned to said end portion and adapted to be in a bearing relationship to said end portion to restrict movement of said hook;
  d. a means to apply a first pressure to said locking means to prevent movement of said hook until a second pressure applied to said hook results in a pressure on said locking means opposed to and at least equal to said first pressure to move said locking means to allow said hook to move;
  e. said locking means comprising a first catch means and a tensioning means;
  f. said first catch means having a first means and a second means;
  g. said first means operatively connecting with said main body portion to position said hook;
  h. said second means operatively connecting with said tensioning means;
  i. said cath means being moveable;
  j. said tensioning means applies pressure to said second means to apply said first pressure to said first means and to said first catch means to restrict movement of said
  k. a first shaft;
  l. said hook being mounted on said first shaft;
  m. said hook being capable of rotating;
  n. a second shaft;
  o. said tensioning means comprising a pawl;
  p. said pawl having a first arm and a second arm;
  q. said pawl being mounted on said second shaft;
  r. a spring bearing against said first arm and placing pressure against said first arm;
  s. a contact means on said second arm;
  t. said pawl being capable of rotating;
  u. a third shaft;
  v. said catch means being mounted on said third shaft;
  w. said catch means capable of rotating;
  x. said first means comprising a first recess for receiving part of said main body portion;
  y. said second means comprising a second recess for receiving said contact means mounted on said second arm; and,
  z. when the tension on the hook exceeds the pressure against said first arm said catch means rotates to move said first recess away from said main body portion to allow said hook to rotate.

2. A releasable hook according to claim 1 and comprising:
  a. a rod connecting with said first arm, and,
  b. said spring being mounted on said recess and bearing against said first arm.

3. A releaseable hook according to claim 2 and comprising:
  a. a means to vary the pressure of said spring against said first arm.

4. A releaseable hook according to claim 1 and comprising:
  a frame;
  b. said first shaft being mounted on said frame;
  c. said hook being rotatable on said first shaft;
  d. said second shaft being mounted on said frame;
  e. said pawl being rotatable on said second shaft;
  f. said tensioning spring being mounted on said frame; and,
  g. said catch means being rotatable on said third shaft.

5. A releasable hook according to claim 4 and comprising:
  a. a mounting bracket;
  b. a means connecting said frame and said mounting bracket;
  c. a means to allow said frame and said mounting bracket to move in a first direction wtih respect to each other;
  d. a means to allow said frame and said mounting bracket to move in a second direction with respect to each other;

e. said first direction and said second direction being, substantially, at right angles to each other.

6. A releaseable hook according to claim 5 and comprising:
   a. said hook having a bumping surface;
   b. a bumper block connecting with said frame; and,
   c. said bumper block being positioned to be in the path of travel of said hook when said hook moves and to make contact with said bumping surface.

7. A releaseable hook according to claim 5 an comprising:
   a. a bumper on said mounting bracket;
   b. said bumper being positioned to be in the path of travel of said frame when said frame moves and to make contact with said frame.

8. A releaseable hook according to claim 7 and comprising:
   a. said hook having a bumping surface;
   b. a bumper block connecting with said frame; and,
   c. said bumper block being positioned to be in the path of travel of said hook when said hook moves and to make contact with said bumping surface.

9. A releaseable hook according to claim 1 and comprising:
   a. said contact means comprising a rolling surface;
   b. said contact means being capable of rotating;
   c. when said second pressure applied to said hook results in a pressure on said catch means and said contact means opposed to and at least equal to said first pawl, said end portion and said rolling surface roll with respect to each other to rotate said catch means and said end portion to move.

* * * * *